(12) United States Patent
Raman

(10) Patent No.: US 6,249,794 B1
(45) Date of Patent: *Jun. 19, 2001

(54) PROVIDING DESCRIPTIONS OF DOCUMENTS THROUGH DOCUMENT DESCRIPTION FILES

(75) Inventor: T. V. Raman, Mountain View, CA (US)

(73) Assignee: Adobe Systems Incorporated, San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/997,209

(22) Filed: Dec. 23, 1997

(51) Int. Cl.[7] ................................ G06F 15/00
(52) U.S. Cl. ............................ 707/500; 707/516
(58) Field of Search .................. 707/500, 4, 523–526, 707/1–3, 100, 103, 513–516; 709/201–203, 217

(56) References Cited

U.S. PATENT DOCUMENTS 5,495,567 * 2/1996 Iizawa et al. ......................... 707/4
5,604,843 * 2/1997 Shaw et al. ....................... 395/101
5,794,234 * 8/1998 Church et al. ....................... 707/4

OTHER PUBLICATIONS

Guha et al., "Meta Content Framework Using XML," Netscape Communications, 19 pgs., downloaded fron www., Dec. 5, 1997.
Layman et al., "XML," Microsoft Corp., 27 pgs., Jun. 1997.
Fielding et al., "Hypertext Transfer Protocol–HTTP/1.1," Internet Draft, 153 pgs., downloaded from www. Jul. 1996.
Microsoft Corp., Developer Documentation for OLE, 21 pgs., Apr. 1997.

* cited by examiner

Primary Examiner—Hosain T. Alam
Assistant Examiner—Alford W. Kindred
(74) Attorney, Agent, or Firm—Fish & Richardson P.C.

(57) ABSTRACT

Document description files are used to encapsulate structural and meta information associated with a document stored on a computer-readable medium. Document description files are external to native application files and have a set of required fields. Document description files point to the referenced document data using Uniform Resource Locators (URLs) and serve as virtual documents. In addition to the required fields, applications can choose to encode additional structural information in the document description files.

66 Claims, 4 Drawing Sheets

PROVIDING DESCRIPTIONS OF DOCUMENTS THROUGH DOCUMENT DESCRIPTION FILES

BACKGROUND OF THE INVENTION

The present invention relates to computer file formats capable of enhancing cross-application interoperability.

Computer content authoring application programs, such as word processing applications and spreadsheet applications, produce content having varying levels of structure. Furthermore, different authoring applications store content and structural information using different file formats. Typically, the file format used by one authoring application is not understood by other authoring applications. As a result, the content and structural information stored in a file is typically accessible only to the authoring application that produced the file and to other authoring applications which have been specifically designed to understand the file format of the file. Authoring applications which have not been specifically designed to understand the file format of the file may be able to retrieve the content stored in the file, but typically will not be able to retrieve the structural information stored in the file.

In networked environments where there is a large amount of communication among applications and among computers, requiring each application to understand the file formats used by other applications is becoming increasingly unwieldy and inefficient. One method which has been used to address this problem is the use of a "universal" file format which attempts to encapsulate all possible content and structural information that can be generated by any application program. Files stored in such a format, however, tend to be large, and cannot be guaranteed to be capable of encapsulating information generated by future versions of application programs.

SUMMARY OF THE INVENTION

In one aspect, the invention features a method executed on a computer for generating a first document description file for describing a document stored on a computer-readable medium. The method generates a description of an application which produced the document, generates a description of a location from which the document can be obtained, and generates a description of an operation that can be performed on the document to produce a second document description file. The description of the location may be a uniform resource locator. The uniform resource locator may identify a server configured to produce the document upon request. The uniform resource locator may identify a location at which the document is stored. The content of the first document description file and the content of the second document description file may be represented in XML syntax.

The operation may be a transformation of the document from a file stored in a first storage format to a file stored in a second storage format, and the second document description file describes the file stored in the second storage format. The second document may describe the first document description file. The operation may extract information from the document, and the second document description file describes the information extracted from the document. The second document description file may describe the first document description file. The information extracted from the document may describe a range of pages of the document. The document may represent a multi-layered graphical object, and the information extracted from the document describes a subset of the layers of the multi-layered graphical object.

The method may generate application-specific data describing the document. The application-specific data may be a name of an application that produced the document. The application-specific data may be a version number of an application that produced the document.

The method may generate a field containing information describing the document. The field may be an HTTP header. The field may describe a date on which the document was produced. The field may describe a date on which the document was modified. The field may describe a size of the document. The field may describe content contained in the document.

In another aspect, the invention features a method for processing a request document description file stored on a computer-readable medium, the request document description file describing a source document and an operation to be performed on the source document. The request document description file is received from a client, the source document is retrieved, the operation is applied to the source document to produce information derived from the source document, and a response document description file is generated containing a description of the information derived from the source document.

The information derived from the source document may be a result document. The response document description file may be a pointer to the result document. The description of the information derived from the source document may be the result document. The description of the information derived from the source document may be a pointer to the result document. The pointer may be a uniform resource locator. The response document description file may be generated by generating a description of the source document. The description of the source document may be the source document. The description of the source document may be a pointer to the source document. The pointer may be a uniform resource locator. The response document may be transmitted to the client. The information derived from the source document may be transmitted to the client.

In another aspect, the invention features a document description file, stored on a computer-readable medium, for describing a document stored on a computer-readable medium, the document description file containing a description of an application program which produced the document, a description of a location from which the document can be obtained, and a description of an operation that can be performed on the document to produce a second document description file. The operation that can be performed on the document may be a transformation of the document from a file stored in a first storage format to a file stored in a second storage format, and the second document description file describes the file stored in the second storage format. The operation that can be performed on the document may be extraction of information from the document, and the second document description file describes the information extracted from the document. The document description file may contain a description of an operation to be performed on the document.

A document description format (DDF) file encapsulates the location of a document along with useful descriptive information about the document. This enables authoring applications to capture and export information about content without requiring changes to current authoring application file formats. A DDF can be used as a virtual document to capture as much or as little information about data contained in a native authoring application file as is desired by the application and/or user.

Among the advantages of the invention are one or more of the following.

One advantage of the invention is that the content of a document description format (DDF) file is independent of the authoring application used to produce the file described by the DDF. Different authoring applications can therefore use DDF files to cooperatively manipulate, synthesize, and exchange document data. Although DDFs are independent of application-specific data, application-specific data can optionally be encapsulated within a DDF in order to optimize certain operations.

Another advantage of the invention is that the size of a DDF file is typically much smaller than the document which it describes. A typical DDF file is a few hundred bytes long. This aspect of the invention is particularly advantageous when used in conjunction with files, such as multimedia files, which are typically very large. Because the size of a DDF file is independent of the size of the file described by the DDF, the size of a DDF file will typically not increase if the size of the document described by the DDF increases. Local storage of DDF files instead of native files can therefore result in significant storage savings.

Another advantage of the invention is that, as a result of the small size of DDF files, exchange of DDF files is more efficient than exchange of the native files described by the DDFs. Many user-level manipulation tasks involve retrieving a diverse set of data items, assembling them, filtering out certain data items, and eventually creating a data aggregation consisting of the data items of interest. The intermediate steps of such operations can be performed more efficiently by using DDFs than by using native files, because of the small size of DDF files and the selective encapsulation of structural information and meta-data provided by DDFs.

Another advantage of the invention is that DDF-aware clients, servers, and applications use late binding, i.e., a reference within a DDF to a native file is not bound to the content of the native file until it is actually necessary to access such content, such as when the file is to be printed. Use of late binding reduces the number of temporary files that are produced when performing a series of operations on a file, thereby increasing the efficiency of such operations.

Another advantage of the invention is that implementing use of the document description format requires minimal modifications to existing application programs. A simple plug-in to an existing application program can be used to enable the application program to save descriptions of existing documents. DDF client software running on a client workstation manipulates DDF files and handles client-server DDF transactions without requiring any modification to existing application programs.

Another advantage of the invention is that it makes more efficient use of client resources. For many transactions, clients need only store and exchange DDF files which are typically much smaller than the application-specific files to which they correspond. Furthermore, because all processing of application-specific files is performed by application-specific servers, the number of authoring applications that clients need to store and execute is reduced. Furthermore, application-specific servers can be optimized to process files produced by specific applications, thereby increasing processing efficiency.

Other features and advantages of the invention will become apparent from the following description and from the claims.

DETAILED DESCRIPTION

Figure 1:
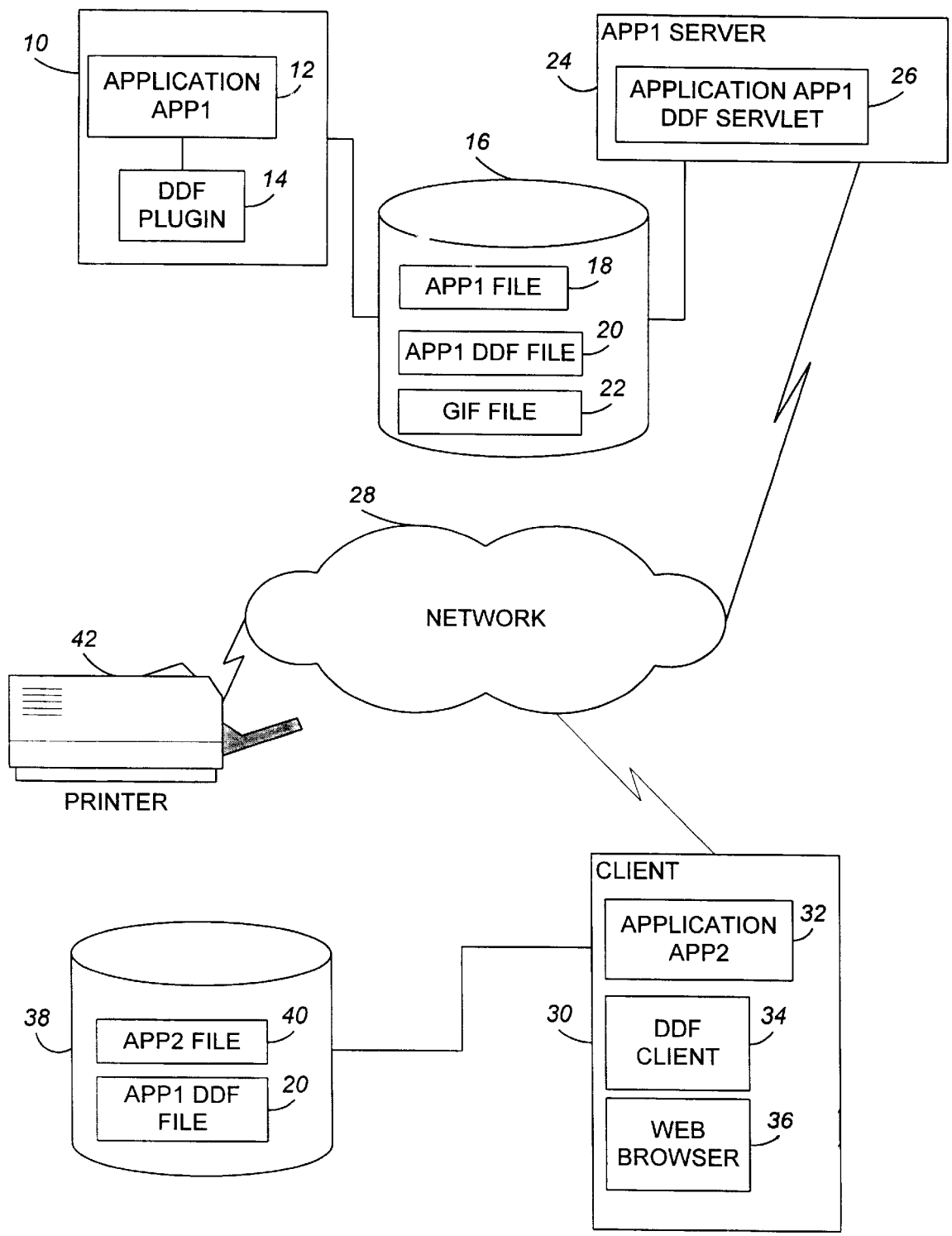
FIG. 1 is a block diagram of a network and computer hardware and software configured to manipulate document description format files.

Referring to FIG. 1, an authoring application APP1 12, such as a word processing application or a graphics application, resides on a client workstation 10. A user uses the authoring application 12 to produce a document having raw information content, and to save the content on a local disk 16 in a file 18 formatted in a native file format of the authoring application 12. If the user desires to access the native APP1 file 18, the user instructs the authoring application 12 to load the native file 18 from the disk 16 into the memory of the client workstation 10. The user may then manipulate the file 18 in the memory of the client workstation 10 using the authoring application 12.

Also residing on the client workstation 10 is a document description format (DDF) plugin 14 to the authoring application 12. A DDF file, described in more detail below, provides an application-independent description of a document saved in a native file format of an authoring application program. The DDF plugin 14 provides the authoring application 12 with the ability to save and retrieve DDF files without requiring any modifications to the authoring application 12. Alternatively, the DDF plugin 14 may save information to and retrieve information from transitory data structures in the memory of the client 10, rather than using DDF files. A separate application or script (not shown) provides a batch operation to produce DDF files corresponding to pre-existing native files.

The DDF plugin 14 interacts with the user by, for example, adding a command to the authoring application 12 which allows the user to save a DDF file corresponding to the file currently open in the authoring application 12. In the case of an authoring application which uses a graphical user interface (GUI), the added command may take the form of a "Save DDF file" menu item in the authoring application's "File" menu. A user's selection of this menu item from within the authoring application 12 causes the DDF plugin 14 to produce a DDF file 20 describing the native file 18, and to optionally prompt the user for additional meta information (e.g., the author's name). The user could also be provided with an option to have the authoring application's default "save file" operation always generate an accompanying DDF file. Alternatively, instead of using the DDF plugin 14, the authoring application 12 may be modified to allow the user to save and retrieve DDF files.

As previously noted, a DDF file describes a document produced by an authoring application. The document described by a DDF file is referred to as the "referenced document" of the DDF file. A DDF file contains three kinds of information about the DDF file's referenced document: (1) meta information such as the location and authoring application of the referenced document; (2) method declarations enumerating the operations that can be performed on the referenced document; and (3) optional application-specific data describing the referenced document.

Figure 2:
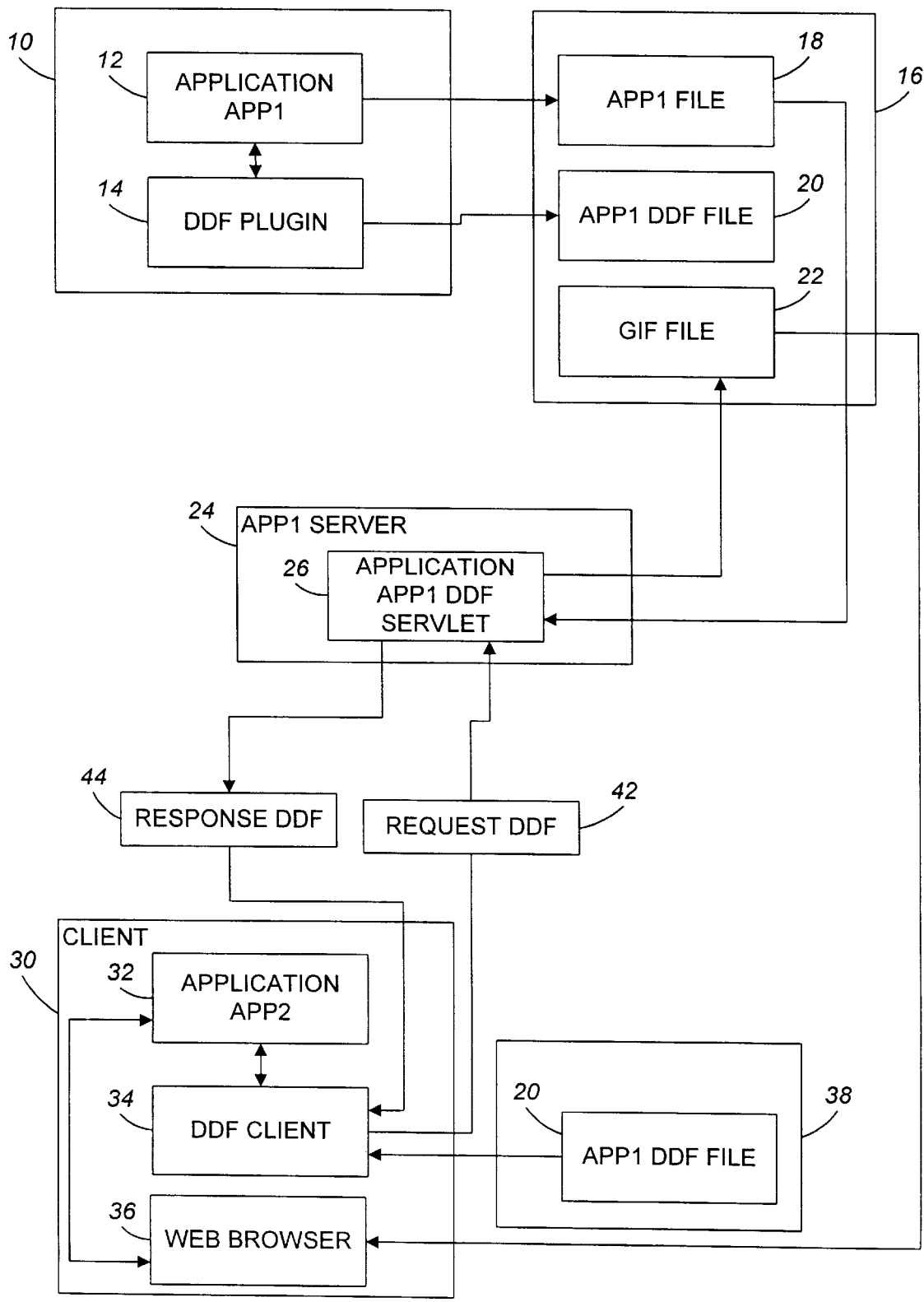
FIG. 2 is a block diagram of the communications that take place among a subset of the elements shown in FIG. 1.

Referring to FIG. 2, the authoring application APP1 12 saves content in native file 18. The authoring application APP1 12 uses DDF plugin 14 to save a DDF file 20 describing the native file 18. A user of authoring application APP2 32, residing on client workstation 30, desires to obtain a copy of native file 18 transformed into Graphics Interchange Format (GIF). The user instructs DDF client software 34, residing on client workstation 30, to construct a request DDF file 42, containing a request to transform native file 18 into GIF format, from the information contained in APP1 DDF file 20. DDF client software 34 transmits the request DDF file 42 to APP1 DDF servlet software 26, residing on an APP1 server 24. Alternatively, DDF client software 34 transmits the APP1 DDF file 20 and a separate request (not shown) to APP1 DDF servlet software 26.

APP1 DDF servlet software 26 transforms the native APP1 file 18 into GIF format and stores the resulting GIF file 22 on disk 16. APP1 DDF servlet software 26 constructs a response DDF file 44, which encapsulates the request DDF file 42 and describes the GIF file 22, and transmits the response DDF file 44 to the DDF client software 34. The DDF client software transmits information contained within the response DDF file 44, such as the location of the GIF file 22, to the authoring application APP2 32. Authoring application APP2 32 uses standard web browser software 36, residing on client workstation 30, to retrieve the GIF file 22.

In one implementation, a DDF file minimally contains: (1) header fields, such as Hypertext Transfer Protocol (HTTP) 1.1 header fields, describing properties of the referenced document, such as its title and the date on which it was produced; (2) a field specifying the authoring application that produced the referenced document; and (3) an address or location of the referenced file, such as a Uniform Resource Locator (URL). An example of a DDF file that references an Adobe Photoshop document is shown in Table 1.

TABLE 1

```
<DDF>
    <URL VALUE="http://www.company.com/doc.psi"/>
    <Date VALUE="Mon Aug 4 09:48:55 PDT 1997 "/>
    <Title VALUE="Picture of House"/>
    <Content-type VALUE="Application/vnd.adobe-photoshop"/>
    <Methods>
        <Transformation NAME="PhotoshopToGif"
            RETURN-TYPE = "Image/Gif"
            PROVIDER = "http://ddf.company.com/ptg.class"/>
        />
        <Information NAME="EnumLayers"
            RETURN-TYPE = "Layers"
            PROVIDER = "http://ddf.company.com/el.class"/>
        />
    </Methods>
    <Application-data>
        <Application-name VALUE = "Adobe Photoshop"/>
        <Application-version VALUE = "4.0"/>
    </Application-data>
</DDF >
```

As shown in Table 1, all DDF elements (e.g., "DDF", "Methods") are encoded in Extensible Markup Language (XML) syntax, and can therefore be parsed by a conforming XML parser even if that parser does not understand the semantics of application-specific data contained in the DDF file. DDF element and attribute names are case insensitive.

In the DDF file shown in Table 1, the element labeled DDF indicates that the file is a DDF file. The VALUE attribute of the URL element specifies the location of the DDF file's referenced document. The VALUE attribute of the Content-type element indicates the Multipurpose Internet Mail Extensions (MIME) content type of the referenced document.

The optional Application-data element contains information about the referenced document that is specific to the authoring application that produced the referenced document. For example, Application-data might include information about the individual layers of a multi-layered object produced by a graphics application, or information about the location of tab stops in a word processing document. Any information contained within the Application-data element need only be capable of being understood by components that directly manipulate the referenced document (e.g., the application APP1 DDF servlet 26 shown in FIGS. 1 and 2). Specifically, DDF client software 34 need not understand the information contained within the Application-data element in order to properly process and manipulate DDF files. Note that DDF files which do not contain an Application-data element still contain sufficient information to enable the retrieval of all application-specific information relating to a referenced document by making a request to an appropriate application-specific server.

The optional Methods element declares methods that can be performed on a DDF file's referenced document to produce information derived from the referenced document. A method may be either a transformation or an information method, as indicated by the Transformation and Information elements, respectively. Transformation methods, when applied to a source DDF, return a response DDF file that describes a transformation of the source DDF's referenced document. Alternatively, a transformation method may return the actual result of applying the transformation method to the referenced document. For example, the transformation method declared by the Transformation element in the DDF file shown in Table 1 transforms the DDF file's referenced document (an Adobe Photoshop file) into a Graphics Interchange Format (GIF) file, and returns the resulting GIF file. Information methods, when applied to a source DDF, return a response DDF file that contains additional information about the source DDF's referenced document. For example, application of the Information method declared in the DDF file shown in Table 1 to a source DDF produces a response DDF file containing a Layers element which contains information about the layers in the source DDF's referenced document (an Adobe Photoshop file).

Both Transformation and Information elements may contain a NAME attribute (describing a name of the method declared by the element) and a PROVIDER attribute (providing a pointer to an implementation of the method declared by the element). Both Transformation and Information elements may have a RETURN-TYPE attribute. For Transformation elements, the RETURN-TYPE attribute specifies the MIME type of the document returned when the method declared by the element is applied. For example, in the DDF file shown in Table 1, the RETURN-TYPE of the PhotoshopToGif transformation method is "Image/Gif," indicating that the result of applying the PhotoshopToGif method is a GIF image. For Information elements, the RETURN-TYPE attribute specifies the name of the DDF element whose content is returned as a result of applying the Information method. For example, the RETURN-TYPE of the Information element in the DDF file shown in Table 1 is "Layers." This indicates if a request DDF file, requesting execution of the "EnumLayers" Information method, is transmitted to an appropriate Photoshop server, the resulting response DDF file will contain a Layers element containing information about the layers of the Photoshop document referenced by the DDF file shown in Table 1. Attributes common to all methods within a Methods element are optionally listed once as attributes of the enclosing Methods element.

Message-IDs may be used to uniquely identify DDF files participating in client-server transactions. Message-IDs are generated in a manner analogous to Message-IDs used in Internet email and Usenet articles. The Request-ID element is a Message-ID used by the DDF client 34 to uniquely identify a request DDF file being submitted to a server. The response DDF file generated in response to such a request DDF file is guaranteed to contain this Request-ID in order to assist the DDF client 34 in associating the response DDF file with the request DDF file. The Response-ID element is a Message-ID used to uniquely identify a response DDF file. Such a Response-ID may be used by the DDF client 34 when submitting future requests for the same resource to the server.

Other elements which may be included in a DDF file include, but are not limited to:

Last-modified, indicating the time that the referenced document was last modified. The format and meaning of this field are analogous to the HTTP/1.1.

Title, indicating a title to associate with the DDF.

Date, indicating that time of creation of the DDF.

Resource-expires, indicating the time that the referenced document expires on the hosting server.

If-modified-since, used in DDF cache validation requests. The interpretation and function of If-modified-since is that same as in HTTP/1.1

Note that all dates within DDF elements use the syntax defined in the HTTP/1.1 specification.

A DDF does not need to contain all of the information contained within the DDF's referenced document. Typically a DDF will contain only structural and meta information derived from the referenced document. A DDF can be thought of as a promise of service that manifests itself as the bits of the referenced document only when presented to an appropriate server with a request to produce the referenced document.

Figure 3:
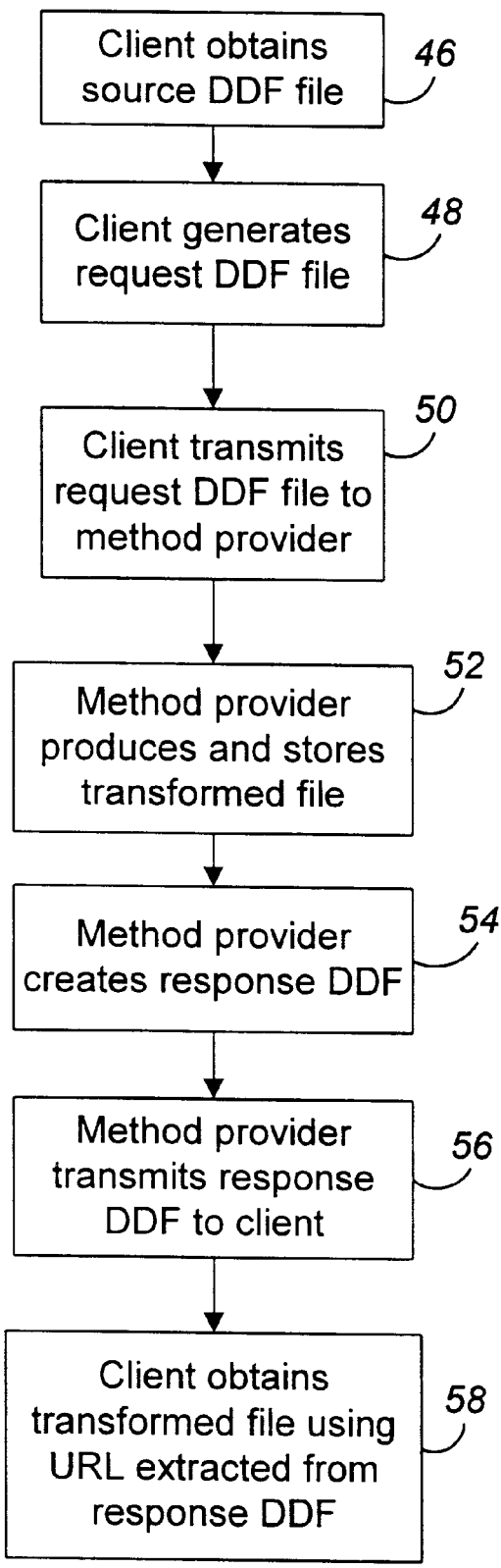
FIG. 3 is a flowchart of a method for applying a transformation to a document description format file.

FIG. 3 shows an approach for applying a transformation method to a DDF file. First, a user obtains a DDF file which will be referred to as the "source" DDF file (step 46). For purposes of this discussion, assume that the source DDF file in this case is the APP1 DDF file 20 shown in FIG. 2. Also, for purposes of this discussion, assume that the APP1 DDF file 20 is the DDF file shown in Table 1, in which the referenced document is an Adobe Photoshop document. The user obtains the source DDF file in any of a number of ways, for example, by browsing an online gallery of Photoshop images using a DDF-enabled web browser, selecting one of the Photoshop images, and selecting a "Save to DDF" menu item. The user stores APP1 DDF file 20 on local disk 38 for future use.

The user activates DDF client software 34 to generate request DDF file 42, encapsulating the source DDF file and a request to transform the source DDF file's referenced document into GIF format (step 48). In general, to apply a method within a DDF file to the DDF file's referenced document, a request DDF file containing an Expose-information element or an Apply-transformation element is produced. These are possibly empty elements that declare calls to an applicable Transformation or Information method declared by the DDF file. These elements are further qualified by appropriate attributes taken from the attribute list of the Transformation or Information method being applied. The DDF itself is an implicit first argument to the method. Additional arguments, if present, are encoded as the contents of the Arguments element of the enclosing DDF. For example, a minimal Apply-transformation element to convert a file into GIF format could appear in a DDF file as <Apply-transformation NAME="convertToGIF"/>. This Apply-transformation element would apply the method named "convertToGIF" to the DDF containing the Apply-transformation element.

In the case of a request to transform the Photoshop document described by the DDF file of Table 1, the request takes the form of an Apply-transformation element in the request DDF file 42. The request DDF file 42 encapsulates, within the Source-DDF element, the source DDF to which the Transformation method is to be applied. The source DDF may be incorporated within the Source-DDF element either by value or by reference. Incorporation by value involves copying the entire source DDF into the Source-DDF element. Incorporation by reference involves placing a URL, which points to the source DDF, within the Source-DDF element. The contents of the request DDF file 42 are shown in Table 2.

TABLE 2

```
<DDF>
    <Date VALUE="Mon, 28 Jul 1997 20:01:12 GMT"/>
    <Creating-Application VALUE="DDF Client"/>
    <Apply-Transformation NAME="PhotoshopToGif"
    Provider = "http://ddf.company.com/ptg.class"/>
    <Source -DDF>
        <!-- DDF of Table 1 is embedded by value here -->
    </Source-DDF>
</DDF>
```

The client transmits the request DDF file 42 to the location of the method provider indicated by the PROVIDER attribute of the appropriate Apply-transformation or Apply-information element of the request DDF file 42 (step 50). For example, referring to FIG. 1, the client 30 transmits the request DDF file 42 to application APP1 DDF servlet 26 over network 28. The APP1 DDF servlet 26 is a provider of a method to transform Photoshop files into GIF files. The method provider applies the requested transformation to the source DDF file's referenced document and produces a transformed file, which it stores locally (step 52). For example, referring to FIG. 1, the APP1 DDF servlet 26 transforms native file 18 from Photoshop format into a GIF file 22, stored on disk 16.

The method provider produces a response DDF file containing information about the transformed file, including a URL pointing to the location at which the transformed file is stored (step 54). In the case of FIG. 1, for example, APP1 DDF servlet 26 produces a response DDF file 44 (FIG. 2) containing a URL pointing to the GIF file 22. The response DDF file 44 is shown in Table 3.

TABLE 3

```
<DDF>
    <Date VALUE="Mon, 28 Jul 1997 20:06:12 GMT"/>
    <Last-Modified VALUE="Mon, 28 Jul 1997 20:05:12 GMT"/>
    <URL VALUE="http://ddf.company.com/house.gif"/>
    <TITLE VALUE="Picture of House"/>
    <Content-Type VALUE="Image/Gif"/>
    <Content-Length VALUE="55174"/>
    <Creating-Application VALUE="Photoshop Server"/>
    <Source-DDF>
        <!-- DDF of Table 2 embedded by value here -->
    </Source-DDF>
</DDF>
```

The method provider transmits the response DDF file 44 to the client 30 (step 56). The client 30 extracts the URL from the response DDF file 44 to request and obtain the transformed file (step 58). For example, referring to FIG. 1, the client 30 extracts the URL from the response DDF file 44 to request and obtain the GIF file 22 using standard web browser 36. Alternatively, in step 56, the method provider transmits the transformed file directly to the client 30 in order to eliminate an additional client-server transaction.

Subsequent requests to the same method provider by the same or a different client for a transformation of the same referenced document into GIF format may be satisfied by the method provider without performing step 52, because the transformed GIF file may already be accessible to the method provider from a previous transformation. The method provider may also obtain an existing GIF file from some other location. The method used by the method provider to obtain the transformed file in any particular case is transparent to the client.

The application-data field of the response DDF can be used to cache the results of applying a method to a source DDF. In the example above involving transforming a Photoshop file into a GIF file, the resulting GIF file is stored within the response DDF's Application-data element. Subsequent requests by the user for a transformation of the same Photoshop file to GIF format are satisfied without accessing the server, because the GIF file being cached within the Application-data element of the response DDF can be extracted by DDF client software 25 and returned directly to the user.

As shown in Table 3, a response DDF encapsulates, within the Source-DDF element, the source DDF to which the response DDF is a response. The source DDF may be incorporated within the Source-DDF element either by value or by reference. Embedding the source DDF within the response DDF (either by reference or by value) provides an audit trail of DDF transactions.

Other operations may also be performed on DDFs. Consider a user who queries a database of graphical images. The user picks three images out of a set of the ten images that result from the query. Information about these three images is assembled to construct a single composite DDF file that is either saved on the user's local disk, printed, mailed to another user, or posted on the World Wide Web. Use of a composite DDF file in the place of the original three documents enables the user to move the composite DDF file around as a single file which is much smaller than the combination of the original three documents. The selected image data will only be retrieved from the image database when necessary, e.g., by a printer when the user requests to print the data, or by an email recipient reading the mail message. Furthermore, the user query could return a set of DDFs instead of the actual images, with the image data being retrieved from the image database at a subsequent time if the user so chooses.

The single composite DDF file described above may be implemented by using an Aggregation element. An example of such a DDF is shown in Table 4. An Aggregation element works like a virtual paper clip for putting together a sheaf of DDFs. In other words, the Aggregation element is the DDF conjunction operator. The component DDFs making up the aggregation may be embedded either by value or by reference. The meaning of the Aggregation element is that when the DDF client 25 processes the aggregation, all of the aggregation's components will be processed.

TABLE 4

```
<DDF>
    <Date VALUE="Mon Aug 4 09:48:55 PDT 1997"/>
    <Title VALUE="Photo Album"/>
    <content-Type VALUE="Application/ddf-aggregation"/>
    <Aggregation>
        <DDF REF="photo-1.ddf"/>
        <DDF REF="photo-2.ddf"/>
        <DDF REF="photo-3.ddf"/>
    </Aggregation>
</DDF>
```

Similarly, the Alternation element can be used within a composite DDF to provide the functionality of a logical disjunction. The Alternation element is used to allow the DDF client 25 to pick one out of a collection of DDFs. The Alternation element itself does not specify which element to pick; the DDF client 25 might choose one of the alternatives in an Alternation based on constraints provided by the environment. For example, consider an image that is to be delivered to the DDF client 25. The image may have several representations, e.g., a low-resolution representation for quick screen previews, a medium-resolution representation for printing on an inkjet printer, and a high-resolution representation for sending to a high-end imagesetter. A DDF Alternation element may be used to encapsulate each of the representations within a single DDF element. When the DDF file containing the alternation is delivered to the DDF client 25, the DDF client 25 chooses which one of the DDF's encapsulated within the Alternation to retrieve, based on the current user environment.

The component DDFs of an alternation may be embedded either by value or by reference. The meaning of the Alternation element is that when the DDF client 25 processes the alternation, one and only one of the alternation's components will be consumed. A DDF file containing an Alternation element is shown in Table 5. Ellipses indicate portions of the DDF omitted for clarity.

TABLE 5

```
<DDF>
    ...
    <Alternation>
        <!-- Alternative 1: embed by value -->
        <DDF>
            <!-- text of DDF file goes here -->
        </DDF>
        <!-- Alternative 2: embed by reference -->
        <DDF ref="http://ddf.company.com/document.ddf"/>
    </Alternation>
</DDF>
```

Another useful operation that can be performed using DDFs is document subsetting. Consider the DDF shown in Table 6. The Application-data element of the DDF contains Start-Page, End-Page, and Number-of-Pages elements, containing information about the starting page, ending page, and number of pages of the referenced document, respectively. A user who wishes to print pages 10 through 20 of the referenced document could use the DDF client 25 to produce a secondary DDF file which encapsulates the original DDF file within the Source-DDF element, having a Start-page of 10 and an End-Page of 20. An example of such a secondary DDF is shown in Table 7. This secondary DDF could be passed to an appropriate application-specific DDF-aware server to obtain a Portable Document Format (PDF) document that has the document data for pages 10 through 20. Similarly, such a secondary DDF could be passed to a DDF-aware printer 42 that downloads only the minimal amount of document data needed to render the desired pages. In other words, DDF-aware applications can use such a secondary DDF file as a substitute for the referenced document until the document data is actually needed.

TABLE 6

```
<DDF>
    <Date VALUE="Fri, 27 Jun 1997 20:06:12 GMT"/>
    <URL VALUE="http://www.company.com/thesis.pdf"/>
    <NAME VALUE="PhD Thesis"/>
    <Content-Type VALUE="Application/PDF"/>
    <Content-Length VALUE="1105232"/>
    <Last-Modified VALUE="Fri, 05 Auq 1994 01:17:21 GMT"/>
    <Creating-Application> VALUE="Adobe Framemaker"/>
    <Application-Data>
        <Application-Version VALUE="5.5"/>
        <Sourae-Data>
            <!-- Application-specific data goes here -->
        </Source-Data>
        <Number-Of-Pages VALUE="143"/>
        <Start-Page VALUE-"1"/>
        <End-Page VALUE="143"/>
        <Number-Of-Chapters VALUE="6"/>
    </Application-Data>
</DDF>
```

TABLE 7

```
<DDF>
    <Date VALUE="Fri, 27 Jun 1997 20:06:12 GMT"/>
    <URL VALUE="http://www.company.com/thesis.pdf"/>
    <TITLE VALUE="PhD Thesis"/>
    <Content-Type VALUE="Application/PDF"/>
    <Content-Length VALUE="1105232"/>
    <Last-Modified VALUE="Fri, 05 Aug 1994 01:17:21 GMT"/>
    <Creating-Application VALUE="Adobe Framemaker"/>
    <Application-Data>
        <Application-Version VALUE="5.5"/>
        <Source-Data>
            <!-- Application-specific data goes here -->
        </Source-Data>
        <Number-Of-Pages VALUE="143"/>
        <Start-Page VALUE="10"/>
        <End-Page VALUE="20"/>
        <Number-Of-Chapters VALUE="6"/>
    </Application-Data>
    <Source-DDF>
        <!-- DDF of Table 6 embedded by value here -->
    </Source-DDF>
</DDF>
```

Figure 4:
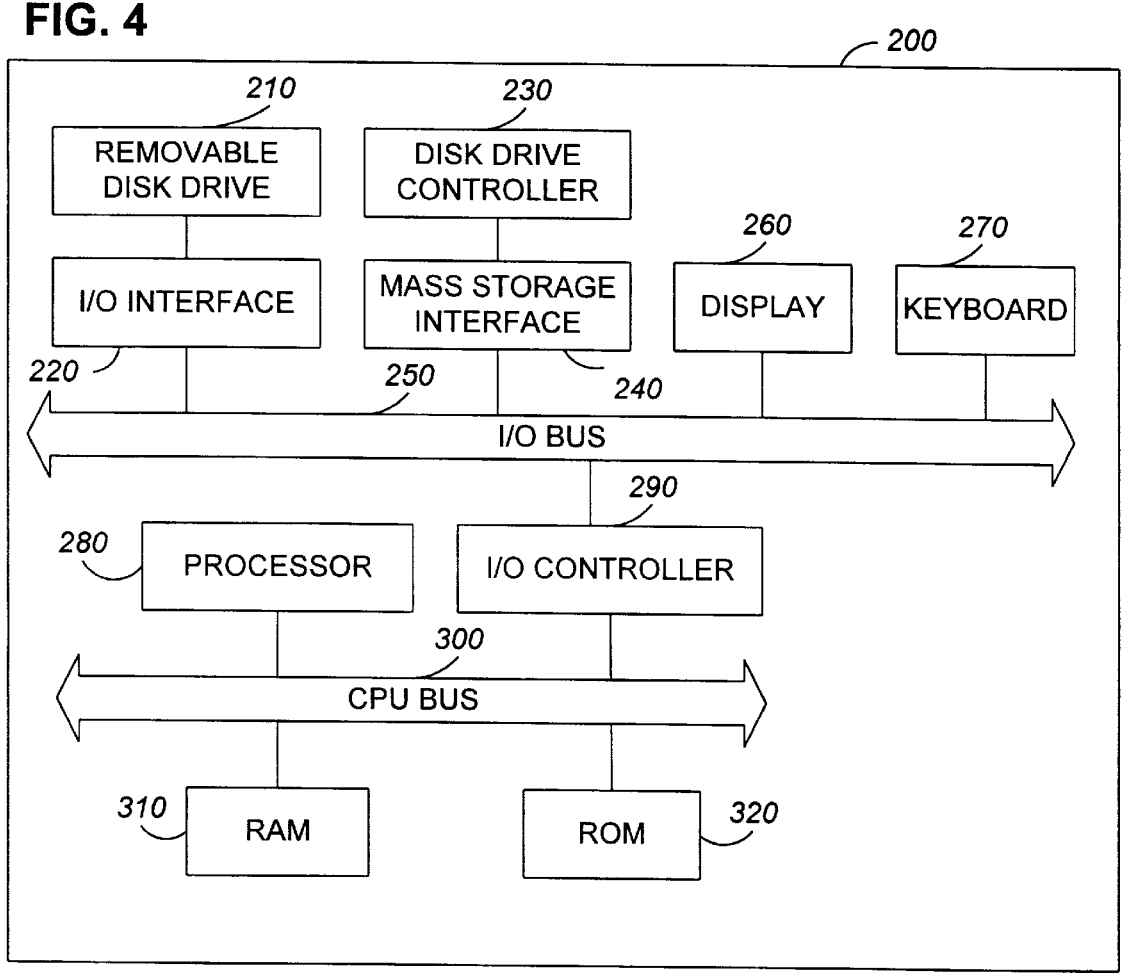
FIG. 4 illustrates a computer and computer elements suitable for implementing the invention.
Figure 4:
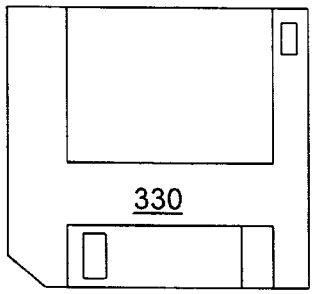

Referring to FIG. 4, the document description format plugin 24 is implemented in digital electronic circuitry or in computer hardware, firmware, software, or in combinations of them. Apparatus of the invention may be implemented in a computer program product tangibly embodied in a machine-readable storage device for execution by a computer processor; and method steps of the invention may be performed by a computer processor executing a program to perform functions of the invention by operating on input data and generating output.

Suitable processors 1080 include, by way of example, both general and special purpose microprocessors. Generally, a processor will receive instructions and data from a read-only memory (ROM) 1120 and/or a random access memory (RAM) 1110 through a CPU bus 300. A computer can generally also receive programs and data from a storage medium such as an internal disk 1030 operating through a mass storage interface 1040 or a removable disk 1010 operating through an I/O interface 1020. The flow of data over an I/O bus 1050 to and from I/O devices 1010, 1030, 1060, 1070 and the processor 1080 and memory 1110, 1120 is controlled by an I/O controller. User input is obtained through a keyboard 1070, mouse, stylus, microphone, trackball, touch-sensitive screen, or other input device. These elements will be found in a conventional desktop or workstation computer as well as other computers suitable for executing computer programs implementing the methods described here, which may be used in conjunction with any digital print engine 1075 or marking engine, display monitor 1060, or other raster output device capable of producing color or gray scale pixels on paper, film, display screen, or other output medium.

Storage devices suitable for tangibly embodying computer program instructions include all forms of non-volatile memory, including by way of example semiconductor memory devices, such as EPROM, EEPROM, and flash memory devices; magnetic disks such as internal hard disks 1030 and removable disks 1010; magneto-optical disks; and CD-ROM disks. Any of the foregoing may be supplemented by, or incorporated in, specially-designed ASICs (application-specific integrated circuits).

Although elements of the invention are described in terms of a software implementation, the invention may be implemented in software or hardware or firmware, or a combination of the three.

The present invention has been described in terms of an embodiment. The invention, however, is not limited to the embodiment depicted and described. Rather, the scope of the invention is defined by the claims.

What is claimed is:

1. A computer-implemented method comprising:

receiving a request for information derived from a first document and a first document description file providing an application-independent description of the first document and being distinct from the first document;

using the first document description file to retrieve the information required to satisfy the request; and generating a second document description file describing the retrieved information.

2. The method of claim 1, wherein using the first document description file to retrieve the information derived from the first document comprises retrieving a second document, stored on a computer readable medium, containing the information derived from the first document.

3. The method of claim 1, wherein the first document description file comprises a description of an operation that can be performed on the document, and retrieving the information derived from the first document comprises performing the operation on the first document to produce the information derived from the first document.

4. The method of claim 1, wherein the information derived from the first document comprises a second document.

5. The method of claim 4, wherein the second document description file comprises a pointer to the second document.

6. The method of claim 5, wherein the pointer comprises a uniform resource locator.

7. The method of claim 4, further comprising transmitting the second document to the client.

8. The method of claim 1, wherein the information derived from the first document comprises the first document.

9. The method of claim 1, wherein the information derived from the first document comprises a pointer to the first document.

10. The method of claim 9, wherein the pointer comprises a uniform resource locator.

11. The method of claim 1, further comprising:

transmitting the second document description file to the client.

12. The method of claim 1, wherein the first document description file contains the request.

13. A document description file, stored on a computer-readable medium, providing an application-independent description of a referenced document stored on a computer-readable medium, the document description file comprising:

a location description for the referenced document, the location description providing sufficient information to enable a program to locate and retrieve the entire contents of the referenced document; the referenced document being distinct from the document description file; and a description of an operation that can be performed on the referenced document to produce information derived from the referenced document.

14. The document description file of claim 13, wherein:

the operation that can be performed on the referenced document comprises a transformation of the referenced document from a file stored in a first storage format to a file stored in a second storage format; and the operation produces a second document description file that describes the file stored in the second storage format and is distinct from the file stored in the second storage format.

15. The document description file of claim 13, wherein:

the operation that can be performed on the referenced document comprises extraction of information from the referenced document; and the operation produces a second document description file that describes the information extracted from the referenced document and is distinct from the referenced document.

16. The document description file of claim 13, further comprising a description of an operation to be performed on the document.

17. A computer-implemented method for retrieving information derived from a first document, the first document being stored on a computer-readable medium, the method comprising:

retrieving by a first client a first document description file providing an application-independent description of the first document and being distinct from the first document, stored on a computer-readable medium, in response to a request from a second client, the first document description file comprising a location description from which the first document can be obtained, the location description providing sufficient information to enable a program to locate and retrieve the entire contents of the first document, and a description of an operation that can be performed on the first document to produce information derived from the first document;

using the first document description file to retrieve the information required to satisfy the request; and transmitting the retrieved information to the second client.

18. The method of claim 17, wherein using the first document description file to retrieve the information derived from the first document comprises retrieving a second document, stored on a computer readable medium, containing the information derived from the first document.

19. The method of claim 17, wherein using the first document description file to retrieve the information derived from the first document comprises performing the operation on the first document to produce the information derived from the first document.

20. The method of claim 17, wherein the information derived from the first document comprises a second document.

21. The method of claim 17, wherein the information derived from the first document comprises the first document.

22. A system comprising:

a first computer-readable medium having a first document produced by a first application;

a second computer-readable medium having a first document description file providing an application-independent description of the first document and being distinct from the first document, the first document description file comprising a description of a location on the first computer-readable medium from which the entire contents of the first document can be obtained, and a description of an operation that can be performed on the first document to produce information derived from the first document; and a server configured to use the first document description file to produce information derived from the first document.

23. The system of claim 22, wherein the information derived from the first document comprises a second document.

24. The system of claim 23, wherein the information derived from the first document comprises a second document description file describing the second document.

25. The system of claim 24, wherein the second document description file further describes the first document description file.

26. The system of claim 22, wherein the first and second computer-readable media are the same computer-readable media.

27. The system of claim 22, wherein the first and second computer-readable media are different computer-readable media.

28. A method, comprising:

generating a composite document description file for describing a combination of a document description file and a second document description file, where the first document description file is distinct from the second document description file, the method comprising:

generating and storing in the composite document description file a description of the combination;

generating and storing in the composite document description file a description of the first document description file, where the first document description file provides an application-independent description of a first document distinct from the first document description file; and generating and storing in the composite document description file a description of the second document description file, where the second document description file provides an application-independent description of a second document distinct from the second document description file.

29. The method of claim 28, wherein the combination is an aggregation of the first document description file and the second document description file.

30. The method of claim 28, wherein the combination is an alternation of the first document description file and the second document description file.

31. The method of claim 28, further comprising:
generating a description of an operation that can be performed on the first document description file and the second document description file.

32. A composite description file, stored on a computer-readable medium, for describing a combination of a first document description file and a second document description file, where the first document description file is distinct from the second document description file, the composite document description file comprising:
a description of the combination;
a description of the first document description file, where the first document description file provides an application-independent description of a first document distinct from the first document description file; and
a description of the second document description file, where the second document description file provides an application-independent description of a second document distinct from the second document description file.

33. The document description file of claim 32, wherein the combination is an aggregation of the first document description file and the second document description file.

34. The document description file of claim 32, wherein the combination is an alternation of the first document description file and the second document description file.

35. The method of claim 22, wherein the composite document description file further comprises:
a description of an operation that can be performed on the first document description file and the second document description file.

36. A method for generating a virtual document for a referenced electronic document, the method comprising:
generating a document description file distinct from the referenced electronic document and providing an application-independent description of the referenced electronic document, the document description file comprising:
an element describing an application program that produced the electronic document;
a location element for the referenced electronic document, the location element providing sufficient information to enable a program to locate and retrieve the entire contents of the referenced electronic document; and
an element describing an operation that can be performed on the referenced electronic document to produce information derived from the referenced electronic document.

37. The method of claim 36, wherein the document description file is generated by the application program as a file separate from the electronic document.

38. The method of claim 36, wherein the document description file is location independent, is declarative, and contains version information including date and time of last modification of the electronic document.

39. The system of claim 36, wherein the location element comprises a uniform resource locator.

40. The system of claim 22, wherein the location element of the first document description file comprises a uniform resource locator pointing to the server.

41. A computer program product stored on a computer-readable medium for providing a server, the product comprising instructions operable to cause a programmable computer to:
receive from a client process a request related to a referenced electronic document and a document description file distinct from the referenced electronic document providing an application-independent description of the referenced electronic document, the document description file comprising elements including a location element providing sufficient information to enable the program to locate an retrieve the entire contents of the referenced electronic document, and one or more elements describing one or more operations that can be performed on the referenced electronic document to produce information derived from the referenced electronic document; and
use the document description file to satisfy the request.

42. The product of claim 41, wherein the request is an element of the document description file.

43. The product of claim 41, wherein the elements describing operations comprise a methods element that declares a method that can perform one of the operations on the referenced electronic document to produce information derived from the referenced electronic document; and the product comprises instructions operable to cause the method to be performed on the referenced electronic document in response to a request for the operation.

44. The product of claim 43, wherein the method is a transformation method that, when applied to the referenced electronic document, returns a response document description file that describes a transformation of the referenced electronic document or that returns an actual result of applying the transformation method to the referenced electronic document.

45. The product of claim 43, wherein the method is an information method that, when applied to the referenced electronic document, returns a response document description file that contains additional information about the referenced electronic document.

46. The method of claim 1, wherein generating a first document description file further comprises generating and storing in the first document description file a description of an application that produced the referenced document.

47. The document description file of claim 13, wherein generating a first document description file further comprises generating and storing in the first document description file a description of an application program that produced the referenced document.

48. The method of claim 1, wherein the size of document description file is independent of the size of the referenced file.

49. A computer file format for describing content of a referenced document stored at a remote storage location on a computer-readable storage medium, the computer file format comprising:
a header field describing properties of the referenced document, the properties including at least a title identifying the referenced document;
a content-type field specifying a first computer content authoring application that produced the referenced document;
an address field specifying the remote storage location of the referenced file, the remote storage location identified by a uniform resource locator; and
a method declaration field enumerating one or more operations that can be performed on the referenced document, the one or more operations including at least a transformation method that, when performed at the remote storage location, transforms the content of the referenced document produced by the first computer content authoring application into content produced by a second computer content authoring application, whereby an application-independent document description file formatted according to the computer file format manifests itself as bits of the referenced document produced by the first computer content authoring application when presented to the remote storage location of the referenced document with a document request from a client running the first computer content authoring application, and manifests itself as bits of the referenced document produced by the second computer content authoring application when presented to the remote storage location of the referenced document with a document request from a client running the second computer content authoring application.

50. The computer file format of claim 49, wherein the one or more operations includes an information method that, when performed, returns a response document description file formatted according to the computer file format, the response document description file including application data specific to the first computer content authoring application.

51. The computer file format of claim 50, wherein the application data describes individual layers of a multi-layered object produced by the authoring application.

52. The computer file format of claim 50, wherein the application data describes the location of tab stops in a word processing document.

53. The computer file format of claim 49, wherein the document description file is generated by a plug-in to the first computer content authoring application.

54. The computer file format of claim 49, wherein the document description file is generated when a save command is executed.

55. The computer file format of claim 49, wherein the document description file contains additional meta information including name of the author of the referenced document.

56. The computer file format of claim 49, wherein the document description file is significantly smaller in size relative to the referenced document.

57. The computer file format of claim 49, wherein the referenced document is a multimedia file.

58. A computer-implemented method comprising:

presenting an application-independent document description file to a remote sever with a document request; and rendering the document description file as bits of a referenced document produced by the first computer content authoring application when the document request is from a client running a first computer content authoring application, and manifesting the document description file as bits of the referenced document produced by a second computer content authoring application when the document request is from a client running the second computer content authoring application, wherein the document description file is formatted according to a computer file format including:

a header field describing properties of the referenced document, the properties including at least a title identifying the referenced document, a content-type field specifying the first computer content authoring application that produced the referenced document;

an address field specifying the remote storage location of the referenced file, the remote storage location identified by a uniform resource locator; and a method declaration field enumerating one or more operations that can be performed on the referenced document, the one or more operations including at least a transformation method that, when performed at the remote storage location, transforms the content of the referenced document produced by the first computer content authoring application into content produced by a second computer content authoring application.

59. The method of claim 58, wherein the one or more operations includes an information method that, when performed, returns a response document description file formatted according to the computer file format, the response document description file including application data specific to the first computer content authoring application.

60. The method of claim 59, wherein the application data describes individual layers of a multi-layered object produced by the authoring application.

61. The method of claim 59, wherein the application data describes the location of tab stops in a word processing document.

62. The method of claim 58, wherein the document description file is generated by a plug-in to the first computer content authoring application.

63. The method of claim 58, wherein the document description file is generated when a save command is executed.

64. The method of claim 58, wherein the document description file contains additional meta information including name of the author of the referenced document.

65. The method of claim 58, wherein the document description file is significantly smaller in size relative to the referenced document.

66. The method of claim 58, wherein the referenced document is a multimedia file.

\* \* \* \* \*

UNITED STATES PATENT AND TRADEMARK OFFICE
CERTIFICATE OF CORRECTION

PATENT NO. : 6,249,794 B1
DATED : June 19, 2001
INVENTOR(S) : Thiruvilwamalai Venkatraman Raman It is certified that error appears in the above-identified patent and that said Letters Patent is hereby corrected as shown below:

Title page,
Item [56], References Cited, OTHER PUBLICATIONS, please delete "Netscape Communication, 19 pgs., downloaded fron" with -- Netscape Communication, 19 pgs., downloaded from --

Column 14,
Line 43, please insert -- first -- between "a combination of a" and "document description".

Column 16,
Line 44, please delete "of claim 1" and insert -- of claim 46 --.

Signed and Sealed this

Sixth Day of August, 2002

Attest:

JAMES E. ROGAN
Attesting Officer  Director of the United States Patent and Trademark Office

UNITED STATES PATENT AND TRADEMARK OFFICE
CERTIFICATE OF CORRECTION

| | | |
|---|---|---|
| PATENT NO. | : 6,249,794 B1 | Page 1 of 1 |
| DATED | : June 19, 2001 | |
| INVENTOR(S) | : Thiruvilwamalai Venkatraman Raman | |

It is certified that error appears in the above-identified patent and that said Letters Patent is hereby corrected as shown below:

<u>Column 16,</u>
Lines 45 and 46, please delete "referenced file" and insert -- referenced document --.
Lines 35 through 38, please replace the entire claim 46 with the following:

-- 46. A method executed on a computer, comprising:
generating a first document description file for providing an application-independent description of a referenced document stored on a computer-readable medium, the first document description file being distinct from the referenced document, the generating comprising:

generating and storing in the first document description file a location description for the referenced document, the location description providing sufficient information to enable a program to locate and retrieve the entire contents of the referenced document;

generating and storing in the first document description file a description of an operation that can be performed on the document to produce information derived from the referenced document; and generating and storing in the first document description file a description of an application that produced the referenced document. --

Line 44, please delete "of claim 1" and insert -- of claim 46 --.

<u>Column 17,</u>
Line 44, please delete "sever" and insert -- server --.
Line 45, please delete "rendering" and insert -- manifesting --.

Signed and Sealed this

Thirteenth Day of May, 2003

JAMES E. ROGAN
*Director of the United States Patent and Trademark Office*